United States Patent [19]

Clauss et al.

[11] 4,187,470
[45] Feb. 5, 1980

[54] DIELECTRIC-LOADED WAVEGUIDE CIRCULATOR FOR CRYOGENICALLY COOLED AND CASCADED MASER WAVEGUIDE STRUCTURES

[76] Inventors: Robert A. Frosch, Administrator of the National Aeronautics and Space Administration, with respect to an invention of Robert C. Clauss, La Crescenta; Rex B. Quinn, La Canada, both of Calif.

[21] Appl. No.: 876,432

[22] Filed: Feb. 9, 1978

[51] Int. Cl.² ............................................. H01S 1/00
[52] U.S. Cl. ...................................... 330/4; 331/94; 333/24 R
[58] Field of Search ............... 330/4; 331/94; 332/7.5; 333/21 A, 24 R, 24.1, 35

[56] References Cited

U.S. PATENT DOCUMENTS

| | | | |
|---|---|---|---|
| 3,002,156 | 9/1961 | Boyle et al. | 330/4 |
| 3,064,201 | 11/1962 | Damon | 330/4 |
| 3,117,282 | 1/1964 | Wessel | 330/4 |
| 3,316,506 | 4/1967 | Whicker et al. | 333/24.1 |
| 3,626,335 | 12/1971 | Hord et al. | 333/21 A |
| 3,761,843 | 5/1972 | Cappucci | 333/35 |
| 3,810,037 | 5/1974 | Nakajima | 333/24 R |
| 3,978,417 | 8/1976 | Clauss | 330/4 |

OTHER PUBLICATIONS

Arams et al., "Packaged Tunable L–Bond Maser System," 5/60, pp. 866–874 Proceeding of the IRE.

*Primary Examiner*—Nelson Moskowitz
*Attorney, Agent, or Firm*—John R. Manning; Paul F. McCaul

[57] ABSTRACT

A dielectrically loaded four-port waveguide circulator is used with a reflected-wave maser connected to a second port between first and third ports to form one of a plurality of cascaded maser waveguide structures. The fourth port is connected to a waveguide loaded with microwave energy absorbing material. The third (output signal) port of one maser waveguide structure is connected by a waveguide loaded with dielectric material to the first (input) port of an adjacent maser waveguide structure, and the second port is connected to a reflected-wave maser by a matching transformer which passes the signal to be amplified into and out of the reflected-wavemaser and blocks pumping energy in the reflected-wave maser from entering the circulator. A number of cascaded maser waveguide structures may thus be housed in a relatively small volume of conductive material placed within a cryogenically cooled magnet assembly.

10 Claims, 5 Drawing Figures

DIELECTRIC-LOADED WAVEGUIDE CIRCULATOR FOR CRYOGENICALLY COOLED AND CASCADED MASER WAVEGUIDE STRUCTURES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

BACKGROUND OF THE INVENTION

This invention relates to a reflected-wave maser structure, and more particularly to a dielectrically loaded microwave circulator for cryogenically cooled maser waveguide structures cascaded for high net gain and wide bandwidth.

A plurality of reflected-wave maser structures can be cascaded in one housing using three-port coupling circulators and isolators or four-port circulators in a volume of conductive material, such as copper. Reduced size permits use of more cascaded structures for more net gain and wider bandwidth compared to the disclosure in U.S. Pat. No. 3,978,417.

In the prior art, a reflected-wave maser is connected to one port of each coupling circulator. Two other ports of the coupling circulator are employed as input and output ports of a reflected-wave maser. The output port of one circulator is coupled to the input port of another circulator through an isolator which may be comprised of a three-port circulator having one port terminated by an absorbing load. It would be desirable to reduce the size of such an arrangement of reflected-wave masers and circulators, such as for X-band and K-band use. For example, at 9 GHz the width of the vacuum or air filled waveguides must be about one inch. Use of dielectric loading can reduce the waveguide width to ¼ inch at 9 GHz. Use of four-port, rather than three-port circulators reduces the size even more by diminating a number of isolators required.

SUMMARY OF THE INVENTION

In accordance with the present invention, a plurality of cascaded reflected-wave maser structures are disposed side by side in a housing, each with a four-port circulator having a dielectrically loaded input waveguide of finite length connected to a first (input) port and a dielectrically loaded output waveguide of finite length connected to the input port of the next circulator. Each maser structure is connected to the second port of a circulator by coupling means which passes the signal energy to be amplified into and out of the reflected-wave maser and blocks the pumping energy from entering the circulator. The fourth port of each circulator is loaded with absorbing material to assure that the signal being amplified travels in only one direction between reflected-wave maser structures. This four-port circulator arrangement permits the reflected-wave maser structures to be placed very close to each other for a reduction in total volume sufficient to allow many other maser sections to be placed in the same space normally devoted to a single maser structure.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
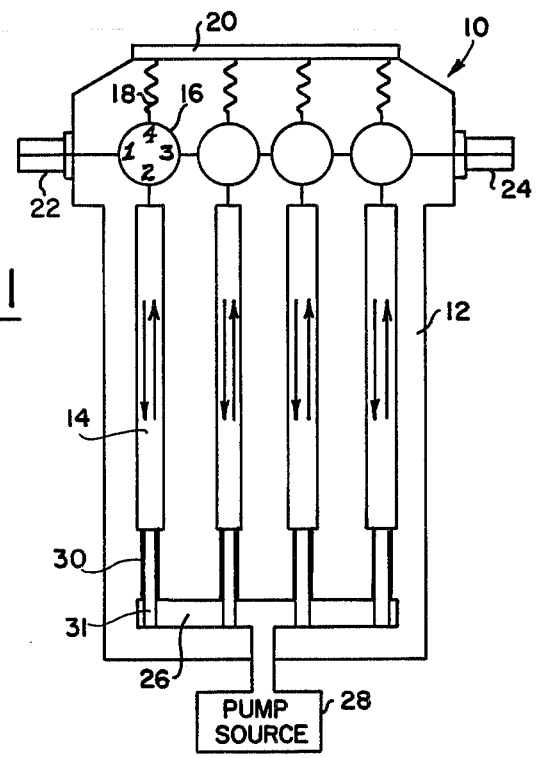
FIG. 1 is a schematic diagram of a plurality of reflected-wave masers connected in cascade by dielectrically loaded four-port circulators within a common housing in connection with the present invention.

Referring now to FIG. 1, a four-stage maser structure 10 is shown schematically in a housing 12 of conductive material, such as copper. Each stage is comprised of a reflected-wave maser 14 and a dielectrically loaded circulator 16. A first port (1) of each circulator functions as an input port for a signal to be amplified; a second port (2) functions as an input-output port for a connected reflected-wave maser; and a third port (3) functions as an output port for the signal amplified. The output port of one stage is connected directly to the input port of the next stage by a dielectrically loaded waveguide. The fourth port (4) of each circulator is loaded with absorbing material schematically indicated by a resistor 18 connected to a ground plate 20.

A coaxial connector 22 couples the signal to be amplified into a dielectrically loaded waveguide connected to a microwave device (not shown), such as an oscillator or a receiving antenna. The signal amplified by each stage is coupled directly to the next stage, as noted above. The input and output waveguides of each stage are loaded with a matching dielectric, i.e., a material having a suitable dielectric constant for the frequency of the signal being amplified to match the impedances of the circulators being coupled. For example, magnesium titanate having a dielectric constant equal to 13 may be used in ¼ inch wide waveguides to match the input and output ports of circulators for a signal operating at 9 GHz. Filling a waveguide with a material having a high dielectric constant, typically 9 to 16, permits reducing the width of the waveguides. Absorbing load material is used to terminate the fourth port of each circulator, thereby to eliminate the danger of signals traveling through the assembly in the wrong direction from an output coaxial connector 24 to the input connector 22. Separate vacuum filled waveguide isolators of much larger size were used between three-port circulators in the prior art assembly disclosed in the aforesaid patent to achieve this isolation.

The result of thus dielectrically loading all of the waveguides in the assembly of FIG. 1 is a significant reduction in the total volume of the housing 12 required for the assembly. To complete the assembly, all that is required is a channel 26 to distribute pumping energy from a source 28 to each reflected-wave maser via a waveguide 30 filled with a rod 31 of alumina designed as a filter to pass pump energy but reflect signals so that pumping energy may enter the reflected-wave masers, but signal energy may not be coupled out through the distribution channel 30.

Figure 2:
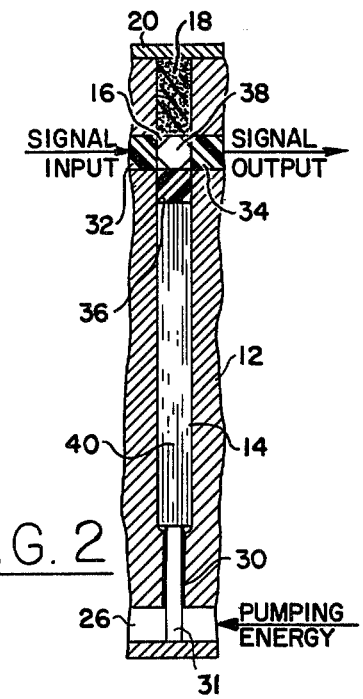
FIG. 2 is a schematic diagram of a section of a reflected-wave maser and its input-output coupling circulator.

FIG. 2 illustrates schematically a sectional view of one of the cascaded measers 14 and circulators 16 shown schematically in FIG. 1. For ease of description, the same reference numerals employed in FIG. 1 are employed in FIG. 2. For X-band frequencies, the input and output port waveguides are ¼ inch with a length selected for matching the circulator input and output ports with the source (connector 22 or other circulator) and load (connector 24 or other circulator). As noted hereinbefore, these input and output waveguides are loaded with a dielectric material shown as sectioned rectangles 32 and 34. The widths of these input and output port waveguides loaded with magnesium titanate may be less than ¼ inch for an operating signal frequency of 9 GHz. The second port of the circulator is coupled to the maser 14 by a waveguide filled with a dielectric matching transformer 36 the length of which is selected to provide a ¼λ matching transformer between the second port of the circulator 16 and the reflected-wave maser 14.

A magnetically biased octagon of Yttrium Iron Garnet (YIG) 38 at the center of the space between the first and third (input and output) ports, and the second and fourth ports, causes the signal flow as shown in FIG. 1 from the signal input port to the ¼λ dielectric matching transformer 36, through a ruby 40 in a magnetic field (not shown) where it is pumped for amplification and reflection at the pump connection of the ruby with the alumina rod 31 in the filter waveguide 30. The reflected signal is pumped for further amplification as it travels back to the transformer 36, through the second port and the YIG to the signal output port.

Figure 3:
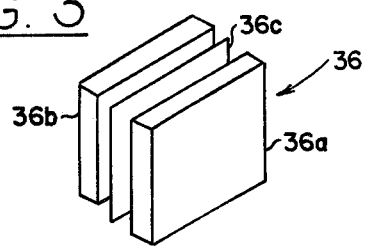
FIG. 3 is an exploded view of the construction of a reflector or block for pump energy adjacent to the circulator of a reflected-wave maser.

FIG. 3 illustrates the construction of the ¼λ dielectric matching transformer 36. It is comprised of two rectangular pieces of dielectric material 36a and 36b with a sheet of conductive material 36c, such as indium. These three elements, when pressed together, fill the waveguide connected to the second port. Since the conductive sheet 36c is parallel to the electric field direction for the pumping energy and normal to the electric field direction of the signal energy, it acts as a reflector for the pump energy and couples signal energy between the circulator 16 and the maser 14.

Figure 4:
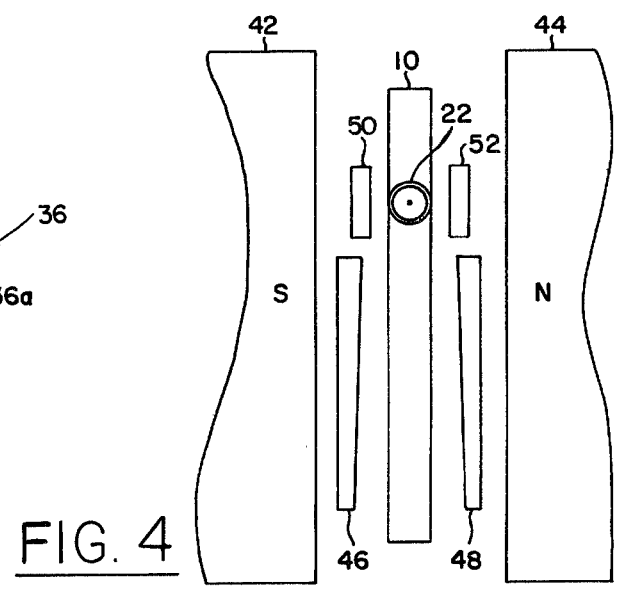
FIG. 4 is a side view of the maser structure of FIG. 1 to show the relationship of the maser structure to the pole pieces of a cryogenically cooled magnet.

Referring now to FIG. 4, it shows schematically a side view of the assembly of FIG. 1 looking from the left, and its relationship to elements employed to shape a magnetic field between pole pieces 42 and 44 of a cryogenic electromagnet. Iron shims 46 and 48 serve to taper the magnetic field for the ruby elements to increase the bandwidth of the maser, as described in the aforesaid priorart patent. Opposite the circulators are samarium cobalt trim magnets 50 and 52 included to optimize the characteristics of the circulators. All of the cryogenic electromagnet comprised of the pole pieces 42 and 44, and the assembly included between the pole pieces, must be placed in a cryogenic refrigerator assembly. By greatly reducing the volume of the maser assembly, made possible mainly by the use of dielectric material in the input and output port waveguides (which in turn permits scaling down the size of the waveguides), it is possible to house eight circulators and reflected-wave masers operating at 9 GHz in a volume that is about 5×2.5×0.8 inches, as will be described with reference to FIG. 5. Each maser waveguide is only about ¼ inch wide, ⅛ inch thick and 3.1 inches long.

Figure 5:
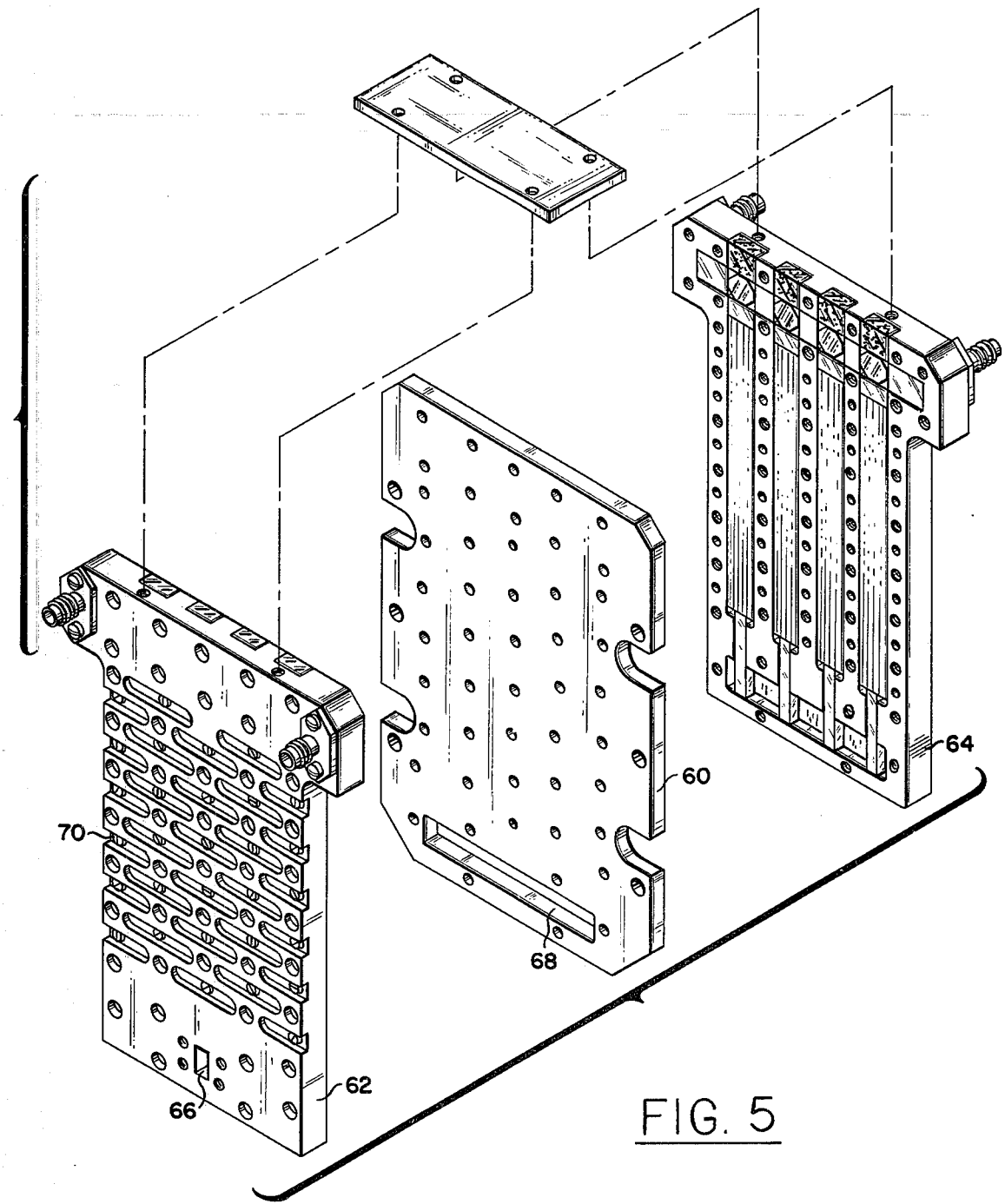
FIG. 5 is an exploded view of an exemplary structure embodying the present invention.

Referring now to FIG. 5, the total of eight masers is made up of two assemblies of four masers each. The two assemblies are made nearly identical in two pieces of conductive material, e.g., copper, with one side of the waveguides, masers and circulators open in order to fit the waveguide loading material, YIG, ruby, matching transformer and filter elements. The two pieces are then closed by opposite sides of a septum 60 shown in FIG. 5 where the two identical assemblies are indicated by the reference numerals 62 and 64. The two assemblies are identical, and correspond to the assembly described with reference to FIGS. 1, 2 and 3, except that only the second assembly 62 has a port 66 for coupling in pumping energy to the distribution channel of that assembly. A broad opening 68 in the septum allows the pumping energy to also fill the distribution channel of the first assembly. The three parts are bolted together through closely spaced holes for good contact throughout to prevent leakage from stage to stage. Additional holes in the assemblies 62 and 64 are for receiving screws 70 which hold elongated leaf springs that press nylon pins through small holes against the ruby, thereby to press the ruby against the septum, as is customary in traveling-wave masers.

Although particular embodiments of the invention have been described and illustrated herein, it is recognized that modifications and variations may readily occur to those skilled in the art, such as the substitution of a particular shape, for example a disc, of either a garnet or ferrite material for a specific frequency to achieve optimum circulator performance. It is therefore intended that the claims be interpreted to cover such modifications and variations.

What is claimed is:

1. A dielectrically loaded four-port waveguide circulator for use with a reflected-wave maser connected to a second port opposite a fourth port between first and third ports thereof to form one of a plurality of cascaded maser waveguide structures, wherein said fourth port is connected to a waveguide loaded with microwave energy absorbing material, said third port of one maser waveguide structure is connected by a waveguide loaded with dielectric material to the first port of an adjacent maser waveguide structure, and the second port is connected to a reflected-wave maser by coupling means which passes the signal energy to be amplified into and out of the reflected-wave maser and blocks pumping energy in the reflected-wave maser from entering the circulator.

2. The combination of claim 1 wherein said coupling means is comprised of two rectangular pieces of dielectric material with a rectangular sheet of conductive material in between, said rectangular pieces of dielectric material and rectangular sheet of conductive material being pressed closely together to fill a waveguide connecting said second port to said reflected-wave maser with the conductive sheet parallel to the electric field direction for the pumping energy and normal to the electric field direction of the signal energy.

3. A plurality of cascaded reflected-wave maser structures are disposed side by side in a housing, each with a four-port circulator having a dielectrically loaded input waveguide of finite length connected to a first port and a dielectrically loaded output waveguide of finite length connected to the first port of the next circulator, each maser structure being connected to the second port of a circulator by coupling means which passes the signal energy to be amplified into and out of the reflected-wave maser and blocks pumping energy from entering the connected circulator, and absorbing material loading the fourth port of each circulator, whereby reflected-wave maser structures may be placed very close to each other for a reduction in total volume.

4. The combination of claim 3 wherein said coupling means is comprised of two rectangular pieces of dielectric material with a rectangular sheet of conductive material in between, said rectangular pieces of dielectric material and rectangular sheet of conductive material being pressed closely together to fill a waveguide connecting said second port to said reflected-wave maser with the conductive sheet parallel to the electric field direction for the pumping energy and normal to the electric field direction of the signal energy.

5. In a cryogenically cooled maser system, a plurality of cascaded reflected-wave maser structures disposed side by side in a housing, each maser being coupled to a four-port circulator, and each circulator having separate waveguides of finite length connected to each port: an input waveguide connected to a first port, a second waveguide coupling a reflected-wave maser to a second port, an output waveguide of finite length connected to a third port, and a fourth waveguide connected to a fourth port, said fourth waveguide being filled with microwave energy absorbing material to terminate said fourth port, and said input and output waveguides and said second waveguide being loaded with a dielectric material, with the output waveguide of one circulator connected as the input waveguide of another circulator in cascade.

6. The combination of claim 5 wherein said dielectric material loading said second waveguide is formed in two rectangular pieces of dielectric material with a rectangular sheet of conductive material in between, said rectangular pieces of dielectric material and rectangular sheet of conductive material being pressed closely together to fill said second waveguide with the conductive sheet parallel to the electric field direction for the pumping energy and normal to the electric field direction of the signal energy.

7. An assembly of cascaded reflected-wave masers between pole faces of a cryogenically cooled magnet, said reflected-wave masers being disposed side by side in a housing, each maser being associated with a four-port circulator having a dielectrically loaded input waveguide of finite length connected to a first port and a dielectrically loaded output waveguide of finite length connected to the third port of one circulator and to the first port of the circulator of the next maser in cascade, each maser structure being connected to the second port of its associated circulator by coupling means which passes the signal energy to be amplified into and out of the reflected-wave maser and blocks pumping energy from entering the circulator, and the fourth port of each circulator being loaded with absorbing material to assure that the signal being amplified travels in only one direction between reflectedwave maser structures, and a channel in said housing for distributing pumping energy to all masers.

8. An assembly as defined in claim 7 wherein said masers are disposed in said housing in parallel with minimum housing structure between them for support and wherein a dielectrically loaded input waveguide of one maser connected in cascade is the dielectrically loaded output waveguide of the preceding maser.

9. An assembly as defined in claim 8 in combination with a second nearly identical assembly, each assembly being made in separate ones of two plates of conductive material with one side of said waveguides, masers, and circulators open to fit component parts thereof, and a septum having a broad opening substantially congruent with the distribution channels of pumping energy in each assembly, each of said two plates of conductive material being fitted with open sides against said septum to form two closed assemblies of cascaded masers.

10. An assembly as defined in claim 9 wherein a port is provided in said plate of conductive material for only one assembly to couple pumping energy into the distribution channel of said one assembly, with pumping energy from said one assembly then being distributed through said broad opening in said septum into the distribution channel of the other assembly.

* * * * *